INVENTOR
DAIJIRO NISHIO

United States Patent Office 3,637,683
Patented Jan. 25, 1972

3,637,683
PROCESS FOR THE PREPARATION OF 4-(2-HY-DROXYPROPIONOYL) MORPHOLINE
Daijiro Nishio, Kanagawa, Japan, assignor to Fuji Photo Film Co., Ltd., Ashigara-Kamigun, Kanagawa, Japan
Filed Nov. 4, 1968, Ser. No. 772,958
Claims priority, application Japan, Nov. 2, 1967, 42/70,563
Int. Cl. C07d 87/34
U.S. Cl. 260—247.7 A            1 Claim

ABSTRACT OF THE DISCLOSURE

An improved process for preparing 4-(2-hydroxypropionoyl) morpholine by the ring-opening reaction of beta-propiolactone with morpholine, the improvement which comprises conducting the ring-opening reaction in the presence of dehydrated diethyl ether.

BACKGROUND OF THE INVENTION

Field of the invention

This invention relates to a process for the preparation of 4-(2-hydroxypropionoyl) morpholine.

Description of the prior art

Although it has been considered heretofore that the preparation of 4-(2-hydroxypropionoyl) morpholine is favorably carried out by the ring-opening reaction of beta-propiolactone with morpholine, it is known [as described in Journal of American Chemical Society; vol. 73, pp. 3168–3171 (1951)] that the reaction of beta-propiolactone and an amine is not regular. This reaction will, in general, form amide or amino acid, depending upon the variety of the amine and the solvent. In the above-mentioned literature, it is disclosed also that an amino acid, 4-(2-carboxyethyl) morpholine—reaction (I), is formed in high yields by reacting beta-propiolactone with morpholine in acetonitrile as a solvent.

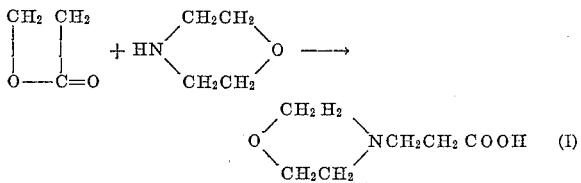

SUMMARY OF THE INVENTION

It has been found that 4-(2-hydroxypropionoyl) morpholine may be produced in the ring-opening reaction of beta-propiolactone with morpholine with a more improved reaction system which comprises conducting the ring-opening reaction in an ether as the reaction solvent. Typical ethers utilized are alkyl ethers and cyclic ethers.

The improved process enables the product which is formed to be very strictly controlled.

It is the principal object of the present invention to provide a process for the preparation of 4-(2-hydroxypropionoyl) morpholine from beta-propiolactone and morpholine.

DESCRIPTION OF THE PREFERRED EMBODIMENTS

The inventor has found, as a result of studies on the reaction of beta-propiolactone and morpholine under various conditions, that the amino acid (I) is formed substantially quantitatively in ordinary reaction solvents, such as water, acetonitrile, benzene, toluene, or N,N-dimethylformamide, whereas an amide, 4-(2-hydroxypropionoyl) morpholine-reaction (II), is formed in high yields when using an ether as the reaction solvent.

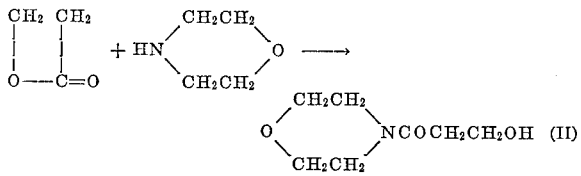

Illustrative of the ethers which may be used in the invention are aliphatic ethers such as diethyl ether, diisopropyl ether and dimethyl glycol, and cyclic ethers such as tetrahydrofuran and dioxane. When diethyl ether is used (which is the most preferred ether), in particular, the amide is obtained substantially quantitatively. At the same time, the amino acid (I) will be markedly formed as a byproduct by the presence of water contained in the ether. Therefore, it is desirable to use a completely dehydrated ether in order to obtain the amide (II) in high yields. Also, only aliphatic and cyclic ethers are operable in this invention.

Preparation of 4-(2-hydroxypropionoyl) morpholine is carried out by adding dropwise, morpholine to a solution of beta-propiolactone in an ether or by adding dropwise, beta-propiolactone to a solution of morpholine in an ether. In any case, the reaction proceeds with the generation of heat, so that it is preferred to remove the heat of reaction by cooling. The thus formed 4-(2-hydroxypropionoyl) morpholine appears in the reaction system as a crystal, which is readily recovered by filtering.

The 4-(2-hydroxypropionoyl) morpholine produced by the process of the invention is thus available as an intermediate product which is capable of producing polymerizable 4-acryloylmorpholine by, after dehydration or acetylation of the hydroxyl group, deacetylation or vinylation.

Figure 1:
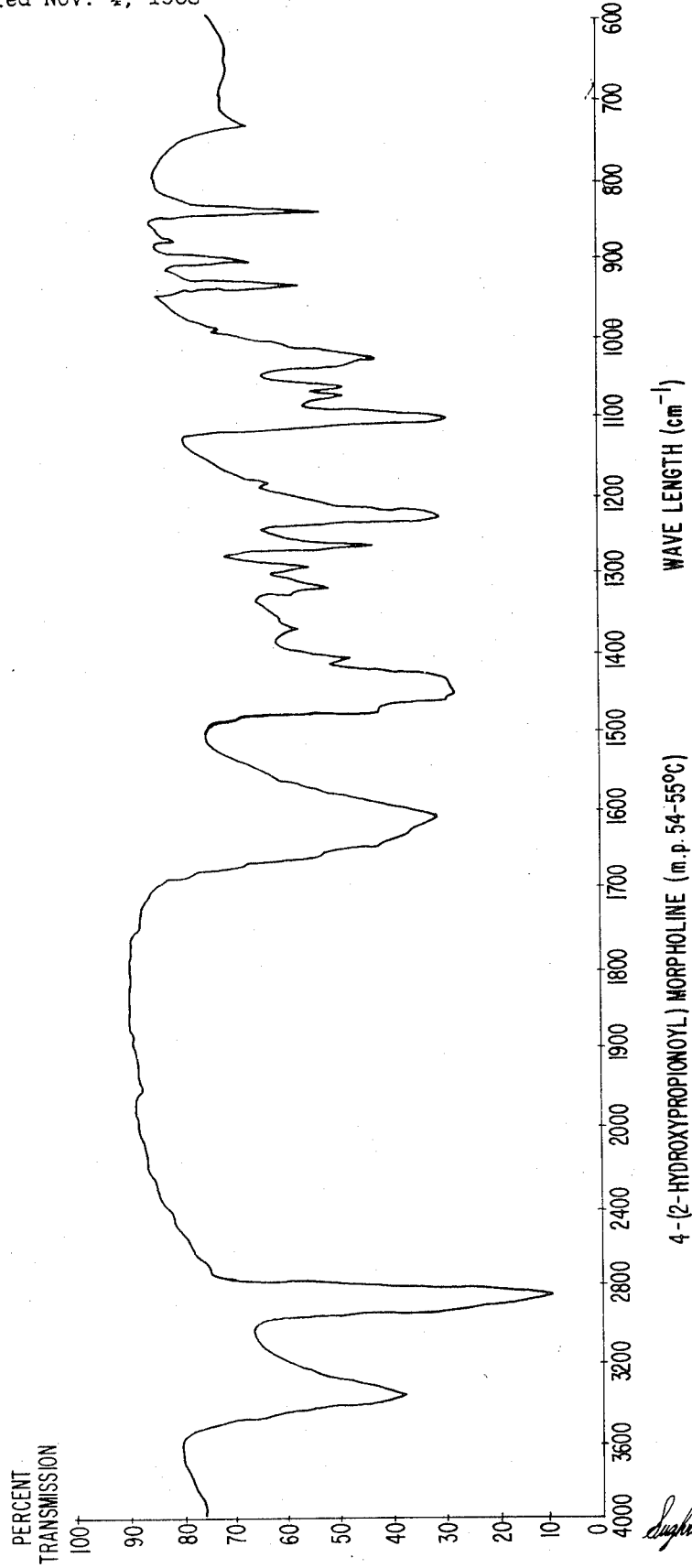
FIG. 1 is a plot of the infrared absorption spectrum of 4-(2-hydroxypropionoyl) morpholine.

FIG. 1 shows the plot of the infrared absorption spectrum of the 4-(2-hydroxypropionoyl) morpholine of this invention.

Figure 2:
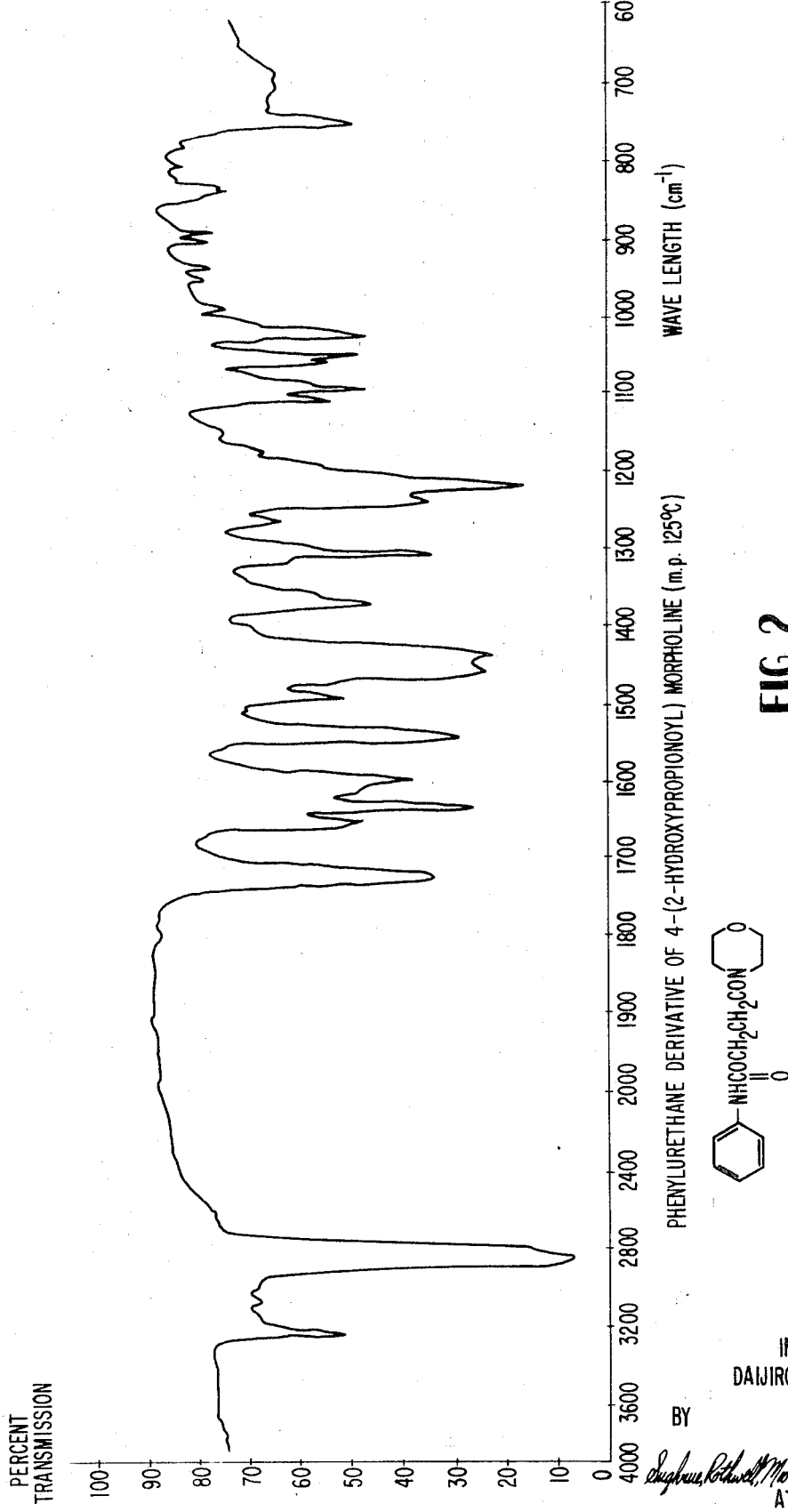
FIG. 2 is a plot of the infrared absorption spectrum of the phenyl urethane derivative of 4-(2-hydroxypropionoyl) morpholine.

FIG. 2 shows a plot of the infrared absorption spectrum of the phenylurethane derivative of 4-(2-hydroxypropionoyl) morpholine.

The present invention will now be illustrated by the following examples, but it is to be understood that its scope is not to be limited to the embodiments described therein.

EXAMPLE 1

130 g. of morpholine was dissolved in 600 ml. of diethyl ether dehydrated with sodium, and 110 g. of beta-propiolactone was then added (dropwise) while cooling with a freezing agent so as to keep the temperature at 0–5° C. A white precipitate was formed as the dropwise addition proceeded. After the addition was completed, the mixture was further stirred for 1 hour to accomplish the reaction, followed by filtering. The yield was 92% (220 g.), the product has a M.P. of 50–55° C., and recrystallization thereof from benzene gave 150 g. of a white needle-like crystal (yield 62%) melting at 53–55° C.

Analysis of the product: Calculated $C_7H_{13}NO_3$ (percent): N, 8.80. Found (percent): N, 9.06.

The presence of a hydroxyl group and an acid amide group was found by infrared absorption spectra (cf. FIG. 1). In order to further confirm the presence of the hydroxyl group, 4 g. of the thus obtained product was dissolved in benzene, to which 3.2 g. of phenyl isocyanate was added, and, after refluxing for two hours, the resultant crystal was filtered and recrystallized from alcohol to obtain 6.5 g. of a white crystal melting at 125° C. It was identified as the phenylurethane derivative of 4-(2-hydroxypropionoyl) morpholine from its infrared absorption spectrum (cf. FIG. 2) and a N-analysis:

Calculated $C_{14}H_{18}N_2O_4$ (percent): N, 10.07. Found (percent): N, 10.01.

EXAMPLE 2

The procedure of Example 1 was repeated, except that 600 ml. of diisopropyl ether dehydrated with sodium was employed as a solvent.

190 g. (78% yield) of a crude product was obtained. Recrystallization thereof from benzene gave 122 g. of 4-(2-hydroxypropionoyl) morpholine (50% yield).

EXAMPLE 3

The procedure of Example 1 was repeated, except that 600 ml. of tetrahydrofuran dehydrated with sodium was employed as a solvent.

During the dropwise addition, a white precipitate was formed and dissolved again. After the reaction, the tetrahydrofuran was distilled off and the residue was allowed to stand for awhile, thus being solidified. The product was identified as a mixture of 4-(2-hydroxypropionoyl) morpholine and 4-(2-carboxyethyl) morpholine by its infrared absorption spectra. Recrystallization thereof from benzene gave 90 g. (37% yield) of 4-(2-hydroxypropionoyl) morpholine melting at 52–55° C. When hydrogen chloride gas was introduced into a small amount of the tetrahydrofuran solution after the reaction, a white precipitate was formed, which was then recrystallized from alcohol to give a white needle-like crystal melting at 207–209° C. It was identified as 4-(2-carboxyethyl) morpholine hydrochloride from its infrared absorption spectra and a N-analysis:

Calculated $C_7H_{14}NO_3Cl$ (percent): N, 7.16. Found (percent): N, 7.02.

EXAMPLE 4

The procedure of Example 1 was repeated, except that 600 ml. of dioxane dehydrated with sodium was employed as a solvent. The thus resulting white crystal was identified as a mixture of 4-(2-hydroxypropionoyl) morpholine and 4-(2-carboxyethyl) morpholine from its infrared absorption spectra.

EXAMPLE 5

The procedure of Example 1 was repeated, except that 600 ml. of a commercial diethyl ether (possibly not completely dehydrated and thus containing some moisture) was employed as a solvent. Recrystallization of the resulting product (210 g., 86% yield) gave 108 g. (44% yield) of 4-(2-hydroxypropionoyl) morpholine melting at 54–55° C. When hydrogen chloride gas was introduced into the mother liquor from the recrystallization, a small amount of white crystal was obtained, which was identified as 4-(2-carboxyethyl) morpholine hydrochloride from its infrared absorption spectra.

What is claimed is:

1. In a process for the preparation of 4-(2-hydroxypropionoyl) morpholine by the ring-opening reaction of beta-propiolactone with morpholine, the improvement which comprises conducting said ring-opening reaction in the presence of dehydrated diethyl ether.

References Cited

UNITED STATES PATENTS 2,526,556  10/1950  Gresham et al. _____ 260—534
2,548,156   4/1951  Gresham _____ 260—561

OTHER REFERENCES

T. L. Gresham et al.: J. Am. Chem. Society, vol. 73, pages 3168–71 (1951).

ALEX MAZEL, Primary Examiner

J. TOVAR, Assistant Examiner